March 15, 1966 J. E. CALABRO ET AL 3,240,950

MAGNETIC COUNTER CIRCUIT WITH CONSTANT OUTPUT PULSE WIDTH

Filed Oct. 25, 1962

INVENTORS
James E. Calabro &
BY Anthony M. Marsh
Paul J. Ethington
ATTORNEY 3,240,950

MAGNETIC COUNTER CIRCUIT WITH CONSTANT OUTPUT PULSE WIDTH

James E. Calabro, Kokomo, and Anthony M. Marsh, Greentown, Ind., assignors to General Motors Corporation, Detroit, Mich., a corporation of Delaware Filed Oct. 25, 1962, Ser. No. 233,123
5 Claims. (Cl. 307—88)

This invention relates to a counting circuit adapted to produce an output signal of predetermined duration in response to a predetermined number of input signals and, more particularly, to such a circuit employing a saturable core memory element, the magnetic state of which is reversible in discrete steps.

There are many instances in which it is desirable to obtain an output signal after the occurrence of a preselected number of input signals. Circuitry which may accomplish such a step often is called for where it is desirable to trigger a manufacturing step subsequent to a predetermined sequence of manufacturing steps. Additionally, a circuit which may accomplish the abovementioned result may also be used as a frequency converter. One class of circuitry developed for these purposes makes advantageous use of the square loop properties of a saturable core inductor wherein the inductor is composed of a ferromagnetic material. Such a saturable core inductor may be placed in a state of positive magnetic saturation and reversed in discrete steps to a negative saturation state. The saturable core is capable of remembering each negative increment and, thus, may be used as a counting or memory element.

It is of notable advantage in such circuits to simplify the winding configuration of the saturable core element in order to expedite the manufacturing process. Additionally, it is of advantage to provide a circuit capable of producing an output signal of predetermined duration in response to a predetermined number of input signals also having a predetermined duration.

Accordingly, the present invention provides a counter circuit employing a saturable core inductor requiring but a single winding. First energy storage means each in the form of a capacitor are connected to the inductor to provide a source of energy which may be suitably released upon the occurrence of input signals to stepwise reverse the direction of saturation of the core. An output circuit is provided including a second energy storage device in the form of a capacitor which acts to store energy suitable for biasing the output circuit to a predeterimned state of conductivity. The second energy storage device is interconnected with the first energy storage device so as to be voltage referenced thereto. Substantial discharge of the first energy storage device is effective to discharge the second energy storage device through a path having a predetermined time constant. Discharge of the second energy storage device is effective to bias the output circuit to a second conductivity state for the duration of the discharge of the second energy storage device.

The present invention will be more readily understood upon reading of the following description of a particular embodiment thereof which is to be taken in conjunction with the illustrative figures of which:

Figure 1:
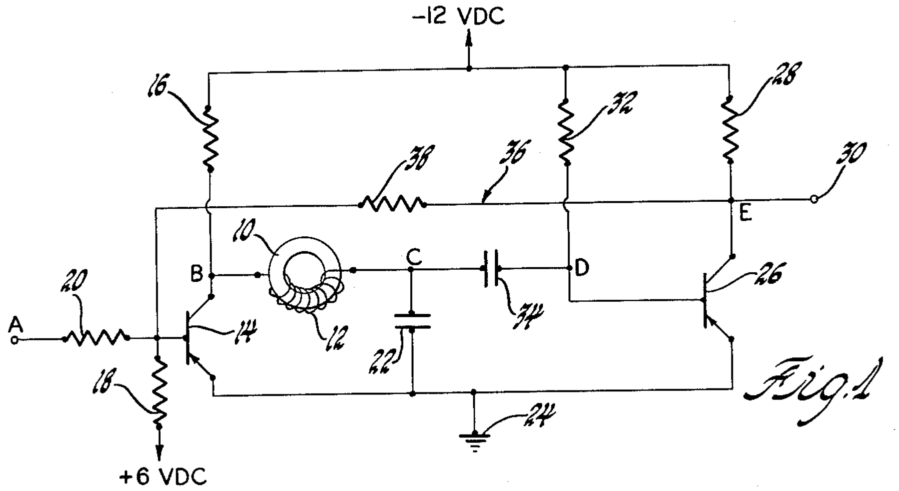
FIGURE 1 is a schematic diagram of an illustrative embodiment of the present invention.

Referring now to FIGURE 1, there is shown a core 10 of square loop ferromagnetic material. Disposed on the core 10 is a winding 12 which is adapted to produce flux in the core in accordance with the magnitude of current in the winding 12. An input circuit is provided including a first transistor 14 having the collector commonly connected to one side of the winding 12 and to bias resistor 16 at a point identified as B in the drawing. A source of D.C. potential, indicated on the drawing as 12 volts, is connected between the emiter of the transistor 14 and the other side of resistor 16 to complete the output circiut of transistor 14. The positive terminal of a six-volt source as indicated on the drawing is connected through a resistor 18 to the base of transistor 14. Additionally, an input terminal A is connected through a resistor 20 to the base of transistor 14. It will be seen that as transistor 14 is of the PNP variety, in the absence of a negative signal at input terminal A, the six-volt source connected to the base will be effective to normally bias the transistor 14 to a non-conductive state. A first energy storage element in the form of capacitor 22 is connected between a point 24 of common potential and the other side of winding 12 identified on the drawing as point C.

An output circuit is provided across the 12-volt source and includes a second transistor 26 which is also of the PNP type. Transistor 26 has the emitter thereof connected to the point 24 of common potential and the collector connected through a resistor 28 to the negative terminal of the 12-volt source. The output circuit also includes an output terminal 30 which is connected to the collector of transistor 26 as indicated in the drawing at point E. The base of transistor 26 is connected through a resistor 32 to the negative terminal of the 12-volt source. Additionally, a second energy storage element in the form of capacitor 34 is interconnected between capacitor 22 at point C and the base of transistor 26 as indicated at point D. Capacitor 22 is of a much greater capcitance value than is capacitor 34. A feedback path generally indicated at 36 is provided between the collector of transistor 26 and the base of transistor 14 by means of a resistor 38. It will be seen that the resistor 32 connected between the negative terminal of the 12-volt source and the base of transistor 26 will be normally effective to bias transistor 26 to a conductive state. Thus, the normal voltage appearing on output terminal 30 will be that of the point 24, i.e., approximately zero volts.

Figure 2:
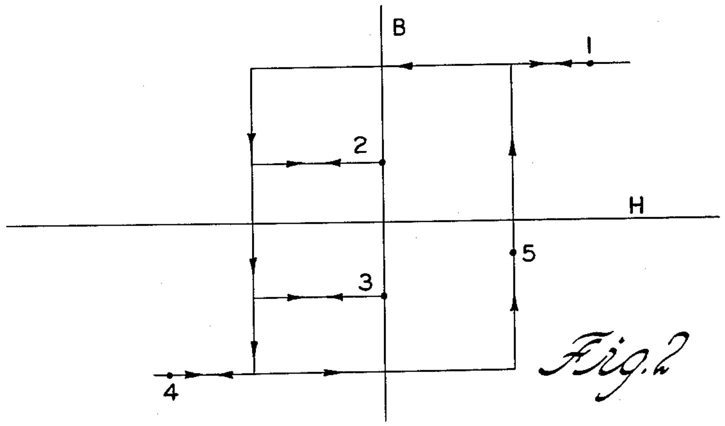
FIGURE 2 is a graphical representation of the hysteresis loop characteristic of a ferromagnetic material used as the memory element in the circuit of FIGURE 1; and, FIGURE 3 is a graph of wave forms appearing at various points in the circuit of FIGURE 1.
Figure 3:
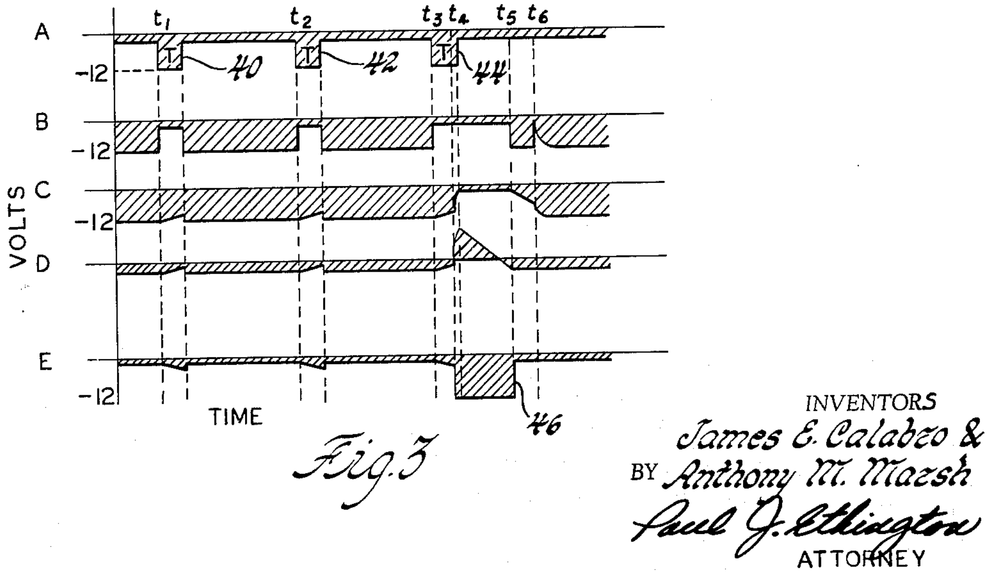

Describing the operation of the circuit of FIGURE 1 in greater detail, reference will be taken to the hysteresis loop diagram of FIGURE 2 and to the wave form chart of FIGURE 3. It is to be understood that the voltages identified on lines A through E of FIGURE 3 correspond approximately with the voltages appearing at the correspondingly identified points in the circuit of FIGURE 1.

In the absence of a signal at the input terminal A, transistor 14 will be biased by the six-volt source to a nonconductive state. Transistor 26 will be biased to a state of conductivity through resistor 32, such that the voltage appearing at point E and, thus, at terminal 30, will be nearly common potential. There will, of course, be a slight voltage drop across the emitter to collector path of the transistor 26. This is indicated on line E of FIGURE 3. Since transistor 14 is at this point non-conductive, point B will be at approximately minus 12 volts and, thus, capacitor 22 will be charged through winding 12 and resistor 16 to approximately the full voltage of the 12-volt source. Additionally, capacitor 34 will be charged through the emitter-base diode of transistor 26, the winding 12 and resistor 16 to approximately 12 volts. The charging current through winding 12 is effective to move the condition of the flux in core 10 from point 4 as indicated in FIGURE 2 through point 5 to point 1, which represents positive magnetic saturation. Referring to the wave form diagram of FIGURE 3, it can be seen that before the occurrence of an input signal on terminal A, points B and C are at approximately the full negative potential of the 12-volt source. Point D is slightly negative due to the forward drop of the emitter-base diode of transistor 26. Point E is also a few tenths of a volt negative because of the drop across transistor 26.

At a time identified as $t_1$ in FIGURE 3, a negative voltage pulse 40 of approximately minus 12 volts is applied to the input terminal A. This pulse 40 has a predetermined duration identified as T. Upon the occurrence of the negative voltage input signal pulse 40, transistor 14 will be biased conductive, thus, placing point B at approximately common potential for the duration of the pulse 40 as indicated in FIGURE 3B. With point B at the increased potential, the capacitor 22 is provided with a discharge path through the emitter and collector of the now conductive transistor 14 and the winding 12. It is to be noted that current through winding 12 from the charged capacitor 22 will be opposite in direction to that current which originally saturated the core 10 to a position corresponding with point 1 on the diagram of FIGURE 2. Since the discharge current from capacitor 22 tends to reverse the saturated condition of core 10, winding 12 will present a very high impedance to the discharge current. Therefore, the voltage at point C will rise only marginally as shown in FIGURE 3C. The voltage on capacitor 34 which is tied to capacitor 22 at point C will also rise marginally as shown in FIGURE 3D. Thus, transistor 26 will remain conductive and the voltage appearing at output terminal 30 will remain substantially undisturbed as shown in FIGURE 3E. During the pulse 40 the discharge current from capacitor 22 will be effective to move the operating point on the hysteresis loop of FIGURE 2 to point 2, thus, partially reversing the flux saturation of core 10 in a first discrete step.

Upon the occurrence at time $t_2$ of a second negative input signal pulse 42, the above-described procedure will reoccur. This second pulse 42 will again partially discharge capacitor 22 to reverse the remanent flux condition of core 10 to point 3 of FIGURE 2. It is to be understood that during the input pulses 40 and 42 the charge on capacitor 22 which is dissipated through the winding 12 is effective to lower the voltage at point C only a few tenths of a volt. This is exaggerated for purposes of illustration on lines C and D of FIGURE 3. This minimal voltage fluctuation is not enough that the core 10 will be resaturated in the time between pulses 40 and 42. Thus, the time period between pulses 40 and 42 may be any value.

At time $t_3$ a third input pulse 44 is applied to the input terminal A to thus render transistor 14 conductive and further discharge capacitor 22 through the winding 12. The third pulse 44 is effective to move the remanent flux conditions of the core 10 from point 3 to point 4 in FIGURE 2. It can be seen that point 4 corresponds with a condition of negative saturation. In this condition, the winding 12 presents only a slight impedance to the discharge current from capacitor 22. Thus, at time $t_4$ capacitor 22 completely discharges through the winding 12 and moves the voltage at point C rapidly in the positive direction as shown in FIGURE 3C. Since capacitor 34 is voltage referenced to capacitor 22, the discharge of capacitor 22 is effective to carry the voltage stored on capacitor 34 positively such that point D rises to approximately plus 12 volts for an instant as shown in FIGURE 3D. As the voltage wave form of FIGURE 3D crosses the zero or reference line, the bias on the base of transistor 26, going positively, is effective to render the transistor 26 non-conductive. This causes a negative voltage pulse 46 to appear at the output terminal 30 as shown in FIGURE 3E. After time $t_4$, the positive charge on capacitor 34 begins to leak off through resistor 32 which provides a discharge path for capacitor 34 having a predetermined time constant. The output voltage pulse 46 will persist until such time $t_5$ as the voltage on capacitor 34 has discharged through resistor 32 and returned to the negative potential as shown in FIGURE 3D. Hence, the width of the output voltage pulse 46 is only a function of the time constant of capacitor 34 and resistor 32. While transistor 26 is biased to a state of non-conductivity, the feedback path 36 will be effective to apply a negative voltage to the base of transistor 14 to maintain transistor 14 in a conductive state for the duration of the output pulse 46. This is generally indicated at FIGURE 3C.

At such time $t_5$ as capacitor 34 has substantially discharged through resistor 32, transistor 26 will once again be biased to a conductive state by the 12-volt source, and the voltage appearing on the output terminal 30 will return to the common potential. The feedback signal through path 36 will, thus, be removed and transistor 14 will again be biased non-conductive by the six-volt source. Point B, thus, returns to minus 12 volts as shown in FIGURE 3B. Capacitors 22 and 34 then begin to recharge through winding 12. As previously described, this charging current is effective to move the remanent flux condition of core 10 from point 4 back through point 5 to the positive saturation indicated at point 1 of FIGURE 2. Prior to reaching point 1, the impedance presented by winding 12 is very high and capacitors 22 and 34 charge at a very slow rate in spite of the large potential difference between point B and reference point 24, and the potential at point C starts toward negative potential at a slow rate. At time $t_6$ the volt-time integral applied to the winding 12 is sufficient to saturate core 10 in the positive direction; that is, to point 1 of FIGURE 2. At this point the impedance which the winding 12 presents to the charging circuit becomes negligible. Point B at this time is shunted to the point 24 reference potential by a relatively low impedance. At this time the time constant of the charging path for capacitors 22 and 34 has decreased significantly and point C moves rapidly toward the negative supply voltage.

The circuit of FIGURE 1 has been described as a means to provide an output pulse 46 of predetermined amplitude and duration in response to three input voltage pulses 40, 42 and 44, the total of the volt-time integral of which is sufficient to reverse the condition of saturation of the core 10. It is to be understood that a greater or smaller number of input pulses may be chosen by suitably selecting the circuit components of FIGURE 1. Additionally, it will be understood that the six and 12 volt sources indicated in FIGURE 1 are merely illustrative and are not to be construed in a limiting sense. Various additions and modifications to the circuit described herein will undoubtedly be apparent to those skilled in the art and for a definition of the invention, reference should be had to the appended claims.

What is claimed is:

1. A circuit for delivering an output signal of predetermined duration after a predetermined number of input signals comprising: a saturable core inductor, first energy storage means connected to the inductor, means to charge the first storage means through the inductor whereby the inductor is saturated in a first direction, means to partially discharge the first storage means through the inductor in response to the input signals thereby to stepwise reverse the direction of saturation of the inductor, output means adapted to produce an output signal in response to a predetermined bias signal, second energy storage means interconnecting the output means and the first energy storage means and responsive to the substantial discharge of the first energy storage means to apply the predetermined bias signal to the output means, and discharge means connected to the second energy storage means to terminate the bias signal after a predetermined time interval.

2. A circuit for deliverying an output signal of predetermined duration after a predetermined number of input signals comprising: a saturable core inductor, first energy storage means connected to the inductor, means to charge the first storage means through the inductor whereby the inductor is saturated in a first direction, means to partially discharge the first storage means through the inductor in response to the input signals thereby to stepwise reverse the direction of saturation of the inductor, an output circuit comprising a current switching device adapted to produce an output signal in response to a predetermined input signal, second energy storage means, the second storage means being connected to the switching device and the first energy storage means, the second storage means being voltage referenced to the first energy storage means such that the second storage means is effective to bias the switching device to produce the output signal only after the first storage means has substantially discharged, and a discharge path for the second storage means having a predetermined time constant corresponding to the predetermined duration of the output signal.

3. A counting circuit adapted to produce an output signal of predetermined duration in response to a predetermined number of input signals, the circuit comprising a core of substantially square loop hysteresis material, a winding linked to the core, first and second capacitors, a source of electrical energy connected to charge the capacitors through the winding to saturate the core in one direction, a first transistor interconnecting the winding and the first capacitor and responsive to input signals to become conductive to partially discharge the first capacitor through the winding to thereby stepwise reverse the direction of core saturation, an output circuit including a second transistor, bias means connected to maintain the second transistor in one conductivity state, a discharge path for the second capacitor having a predetermined time constant, the second capacitor being connected between the first capacitor and the second transistor such that substantial discharge of the first capacitor causes the second capacitor to discharge through the discharge path whereby the second transistor is biased to a second conductivity state for a period corresponding to the predetermined time constant.

4. A counting circuit adapted to produce an output signal of predetermined duration in response to a predetermined number of input signals, the circuit comprising a core of substantially square loop hysteresis material, a winding linked to the core, first and second capacitors, a source of electrical energy connected to charge the capacitors through the winding to saturate the core in one direction, a first transistor interconnecting the winding and the first capacitor and responsive to input signals to become conductive to partially discharge the first capacitor through the winding to thereby stepwise reverse the direction of core saturation, an output circuit including a second transistor adapted to produce an output signal in accordance with a predetermined bias signal, a bias path connected to the base of the second transistor and adapted to maintain the second transistor in one state of conductivity, the second capacitor being connected between the first transistor and the base of the second transistor, the bias path forming a discharge path of predetermined time constant for the second capacitor whereby the second capacitor is discharged through the path when the first capacitor is substantially discharged, the second capacitor being effective to bias the second transistor to a second state of conductivity for a period related to the predetermined time constant.

5. Apparatus as defined by claim 4 including a feedback path between the first and second transistors to maintain the first transistor conductive for as long as the second transistor is in the second state of conductivity.

References Cited by the Examiner

UNITED STATES PATENTS

| | | | |
|---|---|---|---|
| 2,838,669 | 6/1958 | Horsch | 250—27 |
| 2,988,653 | 6/1961 | Samusenko | 307—88.5 |

IRVING L. SRAGOW, *Primary Examiner.*